US 6,617,781 B2

(12) United States Patent
Murazaki et al.

(10) Patent No.: US 6,617,781 B2
(45) Date of Patent: Sep. 9, 2003

(54) RED LIGHT EMITTING LONG AFTERGLOW PHOTOLUMINESCENCE PHOSPHOR AND AFTERGLOW LAMP THEREOF

(75) Inventors: Yoshinori Murazaki, Komatsushima (JP); Kiyotaka Arai, Naka-gun (JP)

(73) Assignee: Nichia Corporation, Tokushima (JP)

( * ) Notice: Subject to any disclaimer, the term of this patent is extended or adjusted under 35 U.S.C. 154(b) by 0 days.

(21) Appl. No.: 09/785,463

(22) Filed: Feb. 20, 2001

(65) Prior Publication Data

US 2001/0043042 A1 Nov. 22, 2001

Related U.S. Application Data

(63) Continuation-in-part of application No. PCT/JP99/04412, filed on Aug. 16, 1999.

(30) Foreign Application Priority Data

| Aug. 18, 1998 | (JP) | 10-231409 |
| Nov. 16, 1998 | (JP) | 10-325082 |
| Dec. 16, 1998 | (JP) | 10-357835 |
| Mar. 30, 1999 | (JP) | 11-088279 |
| Apr. 26, 1999 | (JP) | 11-117774 |
| May 27, 1999 | (JP) | 11-147733 |

(51) Int. Cl.[7] .................................................. H01J 1/62
(52) U.S. Cl. ....................... 313/486; 313/483; 313/485; 252/301.4 S
(58) Field of Search .................................. 313/468, 483, 313/485–491, 493; 252/301.4 S (56) References Cited

U.S. PATENT DOCUMENTS 6,153,123 A * 11/2000 Hampden-Smith et al. ...... 252/301.4 S

FOREIGN PATENT DOCUMENTS

| JP | 59-102981   |   | 6/1984 |            |
| JP | 59102981 A  | * | 6/1984 | C09K/11/475 |
| JP | 62-27487    |   | 2/1987 |            |
| JP | 4-59888     |   | 2/1992 |            |

* cited by examiner

Primary Examiner—Sandra O'Shea
Assistant Examiner—Peter Macchiarolo
(74) Attorney, Agent, or Firm—Wenderoth, Lind & Ponack L.L.P.

(57) ABSTRACT

A red light emitting afterglow photoluminescence phosphor is a rare earth oxysulfide phosphor activated by Europium, which chemical formula is as follows:

$$Ln_2O_2S:Eu_x,M_y$$

$$0.00001 \leq x \leq 0.5$$

$$0.00001 \leq y \leq 0.3$$

wherein Ln is at least one selected from the group consisting of Y, La, Gd and Lu; M is a coactivator which is at least one selected from the group consisting of Mg, Ti, Nb, Ta and Ga in the chemical formula.

28 Claims, 5 Drawing Sheets

RED LIGHT EMITTING LONG AFTERGLOW PHOTOLUMINESCENCE PHOSPHOR AND AFTERGLOW LAMP THEREOF

This is a continuation-in-part of International Application PCT/JP99/04412, filed Aug. 16, 1999.

TECHNICAL FIELD

The present invention relates to a red light emitting long afterglow photoluminescence phosphor which emits light being excited by visible rays and ultraviolet rays, and an afterglow lamp coated with this phosphor. More specifically, the present invention relates to the red light emitting long afterglow photoluminescence phosphor which is a rare earth oxysulfide phosphor activated by Europium and coactivated by a specified element, and an afterglow lamp coated with this phosphor.

TECHNICAL BACKGROUND

Phosphors, which are irradiated by the light from sunlight and from artificial lighting, and also phosphors, which exhibit afterglow for a relatively long time in dark places, are among phosphors, which are called light storing phosphors because this phenomenon can be repeated several times. Nowadays, with the ever-increasing complications of life, interest in disaster prevention has increased. Particularly the use of light storing phosphors afterglowing in dark places for disaster prevention has become progressively greater. Furthermore, the mixing of light storing phosphors into plastic allows the making of plates, sheets or the like, broadening their use in many fields.

The conventional substances used green light emitting ZnS: Cu phosphor as a light storing phosphor, but it did not provide sufficient performance. This is because this phosphor has the following intrinsic drawbacks. One is the phosphorescent luminance (luminance of the afterglow) which is not high enough to be found within several tens of hours. Another is the dark coloration of the surface due to the precipitation of colloidal metallic zinc on the surface of the crystal of the phosphor because of the decomposition due to the ultraviolet, the problem being a severe reduction or deterioration of the phosphorescent luminance. This deterioration accelerates particularly under the conditions of high temperature and humidity and usually, to ameliorate this drawback, a light proof treatment is applied on the surface of the ZnS:Cu phosphor, but the complete prevention still remains difficult. For this reason, the use of the ZnS:Cu phosphor has to be avoided in external places directly exposed to the sun's rays.

In this connection, a purplish-blue to green light emitting light storing phosphor in which the main crystals are comprised of a chemical compound represented by $MAl_2O_4$ activated by divalent Europium in which M is comprised of at least one metallic element selected from the group consisting of Ca, Sr, Ba, has been disclosed in Japanese Non-examined Patent Publication No. 7-11250 issued in 1995. According to this publication, the phosphor is considered to have solved the intrinsic drawbacks of the here abovementioned zinc sulfide phosphor. Furthermore, the main component of this phosphor has already been disclosed in U.S. Pat. No. 2,392,814, and in U.S. Pat. No. 3,294,699.

A blue-green light emitting long afterglow phosphor has been disclosed in the Japanese Non-examined Patent Publication No. 8-170076 issued in 1996 in which chemical compound is represented by $MO.a(Al_{1-b}B_b)_2O_3$:cR in which MO is at least one of divalent metallic oxides selected from the group consisting of MgO, CaO, SrO, and ZnO R is at least one of rare earth element selected from the group consisting of Pr, Nd, Dy, and Tm.

The long afterglow light storing phosphor of this type emitting purplish-blue to green light, have been much studied and are presently used, but among light storing phosphors emitting red light, are only known CaS:Eu, Tm which have short afterglow properties and a poor chemical stability. Where the phosphors are used such as decoration purpose, because a variety of tones of afterglow are necessary, the achievement of a chemically stable and long afterglow red light emitting long afterglow photoluminescence phosphor has been needed. The hereabove long afterglow means the phosphorescence of photoluminescence with long afterglow time.

Furthermore, as phosphor excited by electron rays, a phosphor of rare earth oxysulfide exited by Europium has been developed and is used as the cathode ray tube being the cathode luminescence phosphor. But, because electron rays excite this phosphor, it has been rarely studied as photoluminescence phosphor excited by ultraviolet rays.

The inventors, by further improving this phosphor, have succeeded in developing a red light emitting long afterglow photoluminescence phosphor with fairly long afterglow properties. Therefore the first object of the present invention is to offer a red light emitting long afterglow photoluminescence phosphor excited by ultraviolet rays or the like, not by electron rays.

Incidentally, the purplish-blue to green light emitting light storing phosphors with long afterglow, have already been developed and are used for afterglow type lamps or the like, such as guide lamps.

Guide lamps are required to be installed at places where many people gather, such as theaters or hotels, by fire regulations in each city. In case of disasters such as an earthquake or a fire, or other accident, commercial power sources are shut down and it is assumed that backup power sources automatically switch on to turn such emergency guide lamps on for least 20 minutes. However, if the backup power sources were broken or their circuits were cut by the disaster, the guide lamps would turn off. In such cases, a complex underground street, a long tunnel, nighttime multistory buildings or the like would become very dangerous. Further, because the conventional guide lamps have a complicated structure, it takes much time and high cost to install them. Therefore, such guide lamps are rarely provided except in places where the laws require them.

Further, guide lamps are needed not only in emergency situations, and if most huge buildings, such as department stores, schools or factories, and regular buildings like stores and houses, are equipped with guide lamps with simple structures and lower costs, this would allow users to see their feet from the time when they turn off the switches on the lights of a room, corridor or staircase, until they reach the exit and, they would be more safe and comfortable.

In this connection, providing a light storing substance capable of absorbing and storing optical energy emitted from a light source on a supporting member, and as a shade positioned within where the light from the light source reaches, has been disclosed in Japanese Non-examined Patent Publication No.58-121088 issued Jul. 19, 1983. By using this light storing substance, backup power sources will not be required. However, the conventional light storing substances are disadvantageous in that they are chemically unstable and are apt to be deteriorated by ultra-violet rays, high temperatures, moisture or the like. Further, the afterglow of these light storing substances is dark and short. Furthermore, sufficient light cannot be obtained by coating a supporting member with a light storing substance.

The second object of the present invention is to offer a long afterglow lamp with a long afterglow without the emergency backup power sources.

DESCRIPTION OF THE INVENTION

In order to solve the above-mentioned problem, the present inventors eventually achieved the present invention, finding out that the problem can be solved by introducing a specific coactivator into the rare earth oxysulfide phosphor activated by Europium, as a result of research to improve long afterglow properties and phosphorescent luminance.

In sum, the red light emitting afterglow photoluminescence phosphor of the present invention comprises a rare earth oxysulfide phosphor which chemical formula includes following ranges:

$$Ln_2O_2S:Eu_{x1}M_y$$

$$0.00001 \leq x \leq 0.5$$

$$0.00001 \leq y \leq 0.3$$

wherein Ln in the chemical formula is at least one member selected from the group consisting of Y, La, Gd and Lu; M is a coactivator which is at least one member selected from the group consisting of Nb, Ta and Ga.

$$Ln_2O_2S:Eu_x,Mg_y,M'_z$$

$$0.00001 \leq x \leq 0.5$$

$$0.00001 \leq y \leq 0.3$$

$$0.00001 \leq z \leq 0.3$$

wherein Ln in the chemical formula is at least one member'selected from the group consisting of Y, La, Gd and Lu; Mg is a first coactivator; M' is a second coactivator which is at least one member selected from the group consisting of Ti, Nb, Ta and Ga.

The activator and the coactivator introduced into the red light emitting long afterglow photoluminescence phosphor of the present invention greatly influence on the phosphorescent luminance. For example, if Ln is Y in the above formula, each value should be adjusted in each range shown below.

The concentration x of activator Eu should be adjusted in the range between equal or more than 0.00001 mol and equal or less than 0.5 mol, per 1 mol of phosphor. This is because if the value is less than 0.00001 mol then the light absorption gets so worse that the phosphorescent luminance reduces, on the other hand, if the value is more than 0.5 mol then concentration quenching occurs and the phosphorescent luminance lowers. More preferable range of x is between $0.00001 \leq x \leq 0.1$, whereby the phosphorescent luminance is much higher within this concentration.

By introducing the coactivator M, the light emission of Eu has an afterglow property. The effective coactivator M is at least one member selected from the group consisting of Nb, Ta and Ga. When the concentration y of the coactivator M is in the range between $0.00001 \leq y \leq 0.3$, the phosphorescent luminance rises. However, if y is less than 0.00001 then the phosphorescent luminance lowers, and if more than 0.3 then the coactivator M tends not to enter into the phosphor as an element and the phosphorescent luminance lowers.

The optimum concentration range of the coactivator M is follows: $0.005 \leq y \leq 0.1$ in the case of Nb, and $0.001 \leq y \leq 0.2$ in the case of Ta or Ga; wherein the phosphorescent luminance remarkably rises within these ranges of concentrations.

If Mg is selected as the first coactivator, it would be greatly effective for improvement of the phosphorescent luminance for synergism by coactivated with at least one member selected from the group consisting of Ti, Nb, Ta, and Ga as the second coactivator M'. The effective range of increasing the phosphorescent luminance is follows: the concentration y of the first coactivator Mg is within the range between $0.00001 \leq y \leq 0.3$; the concentration z of the second coactivator M' is within the range between $0.00001 \leq z \leq 0.3$.

In case the first coactivator M is Mg, the preferable range of the second coactivator M' concentration z is follows: $0.0001 \leq z \leq 0.3$ if M' is Ti; $0.005 \leq z \leq 0.1$ if M' is Nb; $0.001 \leq z \leq 0.2$ if M' is either Ta or Ga; whereby the phosphorescent luminance increases considerably.

In case the second coactivator M' is either Ti, Nb, Ta or Ga, then the preferable range of the first coactivator Mg concentration y is $0.01 \leq y \leq 0.2$.

The red, light emitting long afterglow photoluminescence phosphor of the present invention employs metal oxides such as $Y_2O_3$, $Eu_2O_3$, MgO and $TiO_2$, or chemical compounds, such as carbonates, nitrates, oxalates and hydroxides which can readily become oxides by burning at high temperature as raw materials thereof Because the purity of the raw materials has a strong influence on the phosphorescent luminance, more than 99.9% purity is preferable, and more preferably, 99.99%. To obtain the red light emitting long afterglow photoluminescence phosphor of the present invention, it is necessary to measure these raw materials to the predetermined mol rate, then, further mix them with sulfur and proper flux (such as carbonate of alkaline metal) and then fire them.

The particle diameter of the red light emitting long afterglow photoluminescence phosphor of the present invention influence on the phosphorescent luminance, so preferably it should be controlled its average particle diameter within the range of 5–30 μm. If the average particle diameter is less than 5 μm, then the phosphorescent luminance deteriorates rapidly, or if more than 30 μm, then the phosphorescent luminance decreases depending on the body color of the phosphor. In addition, in case the average particle diameter is over 30 μm, the characteristics of mixing and coating would get worse where it used for decorations, lamps or the like. The most preferable range of the average particle diameter is 10–30 μm, in which the phosphorescent luminance is higher and more stable.

Where the rare earth oxysulfide phosphor activated by Europium, introducing at least one element selected from the group consisting of Nb, Ta and Ga results the red light emitting long afterglow photoluminescence phosphor having long afterglow and chemical stability which could not be achieved by the conventional CaS:Eu,Tm phosphor. Furthermore, higher phosphorescent luminance can be achieved by the combination of coactivators.

The red light emitting long afterglow photoluminescence phosphor of the present invention is applicable to lamps.

There are various types of lamps which excite the afterglow phosphor.

Figure 1:
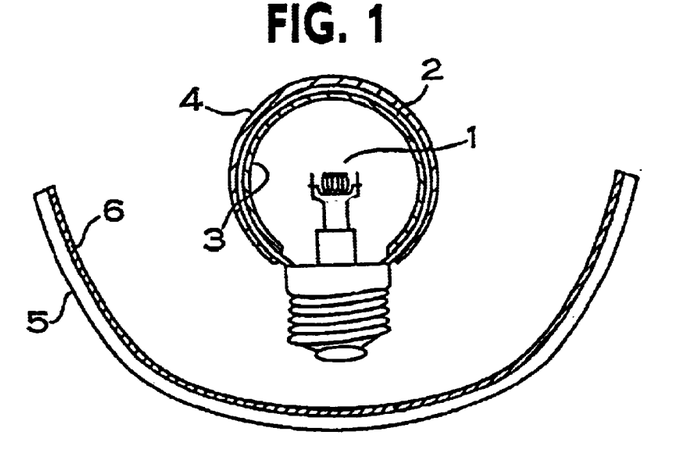
FIG. 1 is a sectional view of an afterglow lamp and the afterglow reflection panel of the present invention.

All kinds of lamps which are currently used in practice are applicable to this, for example, incandescent lamps, fluorescent lamps, HID (high-intensity discharge) lamps and halogen lamps. The FIG. 1 shows an inner fluorescent layer 3 and an outer fluorescent layer 4 coated with the afterglow phosphor on the inner surface and/or the outer surface of a transparent glass 2 covering a light emitting section 1 of the lamp. An afterglow reflection sheet having afterglow properties is also achieved by forming an afterglow fluorescent layer 6 on the surface of the reflection sheet 5 for the lamp.

The thickness of the afterglow phosphor layer applied is dependent on the particle size of the afterglow phosphor which is used, in the meantime its preferable range is 5–100 μm. In case the thickness of the afterglow phosphor layer was out of this range, if less than that, then the amount of the applied long afterglow phosphor would be too small to yield afterglow, on the contrary if more than that, the light emitted from the lamp would be interrupted by the afterglow phosphor such that the original function of the lamp as an illuminator would be lowered.

The afterglow lamps are designed as mentioned above. Turning especially to fluorescent lamps, the phosphor of the fluorescent layer on the inner surface of the glass tube is exited by ultraviolet rays and emits light. Therefore it is also possible to use the ultraviolet rays energy directly. Where the afterglow phosphor is applied on the inner surface of the glass tube of fluorescent lamp, the afterglow phosphor is also exited directly by 253.7 nm mercury rays radiated from a positive column that is a light emitting section of a fluorescent lamp. Consequently, another afterglow fluorescent lamp is made by applying the long afterglow phosphor alone on the fluorescent lamp. In this case, the afterglow light is maximum. Nevertheless, since the lamp is used as a common white light fluorescent lamp in normal situation, preferably it should be used in combination with a phosphor for a fluorescent lamp so that it receives the light from this phosphor for the fluorescent lamp and thereby emits afterglow.

Figure 2:
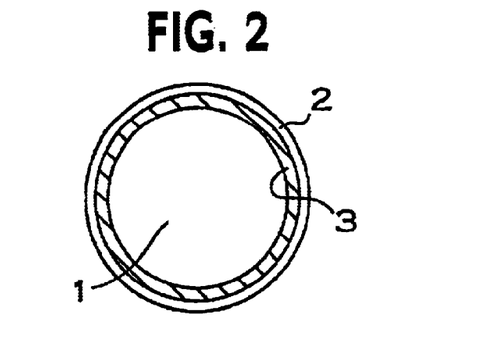
FIG. 2 is a sectional view of an afterglow lamp of the present invention.

For example, an illustration of a structure receiving light from another phosphor is shown in FIG. 2 which is the cross-sectional view perpendicular to the fluorescent lamp tube direction. Energy which is converted from electric energy to optical energy (in this case ultraviolet radiant energy) excites the fluorescent layer 3 formed on the inner surface of a light transmittable glass 2 mainly in the light emitting section 1 of a positive column. In this case it is permissible to mix the afterglow phosphor with an illuminating phosphor, which excites the afterglow phosphor, in the fluorescent layer completely, and it is the easiest way to carry out the invention.

Figure 3:
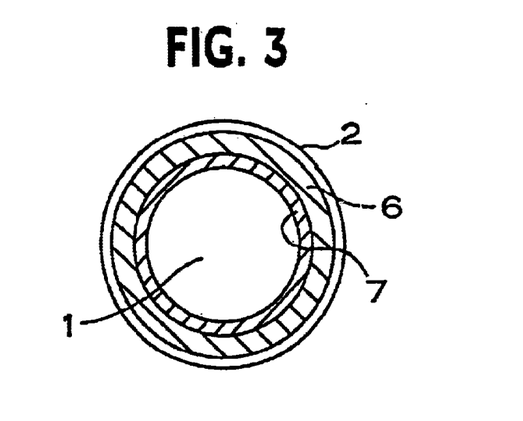
FIG. 3 is a sectional view of an afterglow lamp of the present invention.

Furthermore, there is a so-called bilayer application, in which is formed an afterglow phosphor layer 6 on the inner surface of the light transmittable glass 2 as the first layer, and an illuminating phosphor layer 7 as the second layer, as shown in the sectional view FIG. 3 of a fluorescent lamp. In this method, a 253.7 nm mercury ray is consumed to excite the phosphor for the fluorescent lamp mostly, and the afterglow phosphor is excited by the visible ray from the phosphor layer mostly. The afterglow lamp obtained here yield high level of luminance for illumination and its afterglow also has a high-intensity.

Figure 4:
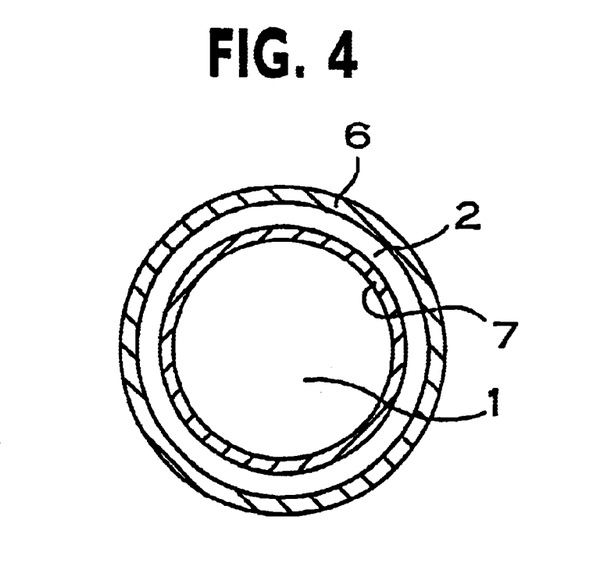
FIG. 4 is a sectional view of an afterglow lamp of the present invention.

On the other hand, as shown in the sectional view FIG. 4 of the fluorescent lamp, it is possible to form an illumination phosphor layer 7 on the inner surface of a transparent glass 2, and an afterglow phosphor layer 6 on the outer surface of its glass tube.

A commonly used illumination phosphor is usable as a phosphor used with the afterglow phosphor, which fills the phosphor layer, concurrently. For example, the following are usable: $(SrCaBaMg)_5(PO_4)_3Cl:Eu$, $BaMg_2Al_{16}O_{27}:Eu$, $Sr_5(PO_4)_3Cl:Eu$, $LaPO_4:Ce,Tb$, $MgAl_{11}O_{19}:Ce,Th$, $Y_2O_3:Eu$, $Y(PV)O_4:Eu$, $3.5MgO-_{0.5}MgF_2-GeO_2:Mn$, $Ca_{10}(PO_4)_6FCl:Sb,Mn$, $Sr_{10}(PO_4)_6FCl:Sb,Mn$, $(SrMg)_2P_2O_7:Eu$, $Sr_2P_2O7:Eu$, $CaWO_4:Pb$, $MgWO_4$, $(BaCa)_5(PO_4)_3Cl:Eu$, $Sr_4Al_{14}O_{25}:Eu$, $Zn_2SiO_4:Mn$, $BaSi_2O_5:Pb$, $SrB_4O_7Eu$, $(CaZn)_3(PO_4)_2:Ti$, $LaPO_4:Ceb$, ect.

Red color emitting phosphors which mainly emit light in wavelength more than 600 nm are not used for exciting the afterglow phosphor. This is because the afterglow phosphor cannot be excited by light emission of such phosphors with long wavelengths. However, the commonly used illuminator fluorescent lamps mostly emit light throughout the visible range. Thus, where having such fluorescent lamps with afterglow property, although red color light is not necessary for the afterglow phosphor, it is still necessary for setting the light color of the fluorescent lamp within a required range.

In view of intensive excitation of afterglow phosphor, white light emitting as the fluorescent lamp illuminator and variable light color of a fluorescent lamp, the most preferable phosphor is the three component type phosphor which comprises a blue light emitting phosphor having a light emission peak around 450 nm wavelength, a green light emitting phosphor having a light emission peak around 545 nm wavelength and a red light emitting phosphor having a light emission peak around 610 nm wavelength. As preferable usage, $(SrCaBaMg)_5(PO_4)_3Cl:Eu$ or $BaMg_2Al_{16}O_{27}:Eu$ is suitable for the blue light emitting phosphor, $LaPO_4:Ce,Tb$ or $MgAl_{11}O_{19}:Ce,Th$ for the green light emitting phosphor and $Y_2O_3:Eu$ for the red light emitting phosphor.

The mixing ratio of the afterglow phosphor constituting the fluorescent layer and the phosphor for the fluorescent lamp mixed therewith can be freely changed according to the purpose of the lamp. For example, when the priority is given to the use as an illuminator, i.e., the luminous flux of the lamp is most important, the proportion of the phosphor for the fluorescent lamp is increased. On the contrary, when luminance and long afterglow are required, it can be realized by increasing the proportion of the long afterglow phosphor.

Further, for manufacturing an afterglow fluorescent lamp, a usual method for manufacturing fluorescent lamps can be applied. For example, a long afterglow phosphor, a phosphor which is put together with the long afterglow phosphor for exciting it and a binding agent such as alumina, calcium pyrophosphate or calcium barium borate are added to a nitro cellulose/butyl acetate solution, and are mixed and suspended to prepare a phosphor coating suspension. The obtained phosphor coating suspension is flown on the inner surface of the glass tube of the fluorescent lamp, then dried through hot air blowing. After that fluorescent lamp is completed following the usual manufacturing steps including baking, evacuation, filament fitting, base attachment or the like.

In coating process on the glass tube, it is possible to form a protective layer, such as alumina, then a phosphor layer thereon, whereby the light emitting performance such as the luminous flux or the luminous flux maintenance is further improved.

The above mentioned afterglow lamp can yield a bright afterglow and therefore eliminates an emergency backup power supply.

It is very economical to apply this afterglow fluorescent lamp to a guide lamp, because it makes it possible to apply the existing illumination device, without providing any particular illumination device like coated with a light storing substance. As a result, the cost restriction associated with choosing the places where the guide lamps are provided can be reduced.

Further, even if this afterglow fluorescent lamp is incorporated into a conventional guide lamp having a backup power supply, it is still useful and it ensures a very reliable guide lamp since it can function as a guide lamp even if the backup power supply or other power supplying circuit is cut down by disaster or other events.

In addition, the afterglow fluorescent lamp can serve not only as emergency lamp, but also as an additional lamp furnished in a room, a corridor or a staircase for illuminating one's feet after one has switched off the light until one reaches an exit, because this afterglow lamp can provide an afterglow of a high luminance for a while after the switch is turned off.

THE PREFERRED EMBODIMENTS OF THE INVENTION

EXAMPLE 1 SHOWING A MANUFACTURING METHOD

This example does not show an embodiment of the present invention. To prepare a phosphor raw material, 46.5 g of $Y_2O_3$, 3.0 g of $EU_2O_3$ and 0.5 g of $MgCO_3$ were prepared and put into a ceramic pot, then sufficiently blended by a ball mill. The resultant was a mixed raw material (hereinafter referred as raw material powder). Next 22.7 g of sulfur (S), 22.0 g of $Na_2CO_3$ as flux were added and mixed to the raw material powder, and its mixture was filled into an alumina crucible and heated for 6 hours at the temperature of 1100° C. After heating, the flux was washed off by water several times, and dried for 10 hours at the temperature of 120° C. Finally a phosphor with its chemical formula $Y_2O_2S$:$Eu_{0.082}$,$Mg_{0.028}$ was prepared.

Embodiments 11–14

The embodiments 11–14 were prepared in the same manner as the embodiment 1 except adding Nb2O5 in place of $MgCO_3$ and varying the amount of $Nb_2O_5$ to obtain phosphors, the chemical formulas of which are as follows:

Embodiment 11 . . . $Y_2O_2S$:$Eu_{0.082}$,$Nb_{0.007}$

Embodiment 12 . . . $Y_2O_2S$:$Eu_{0.082}$,$Nb_{0.018}$

Embodiment 13 . . . $Y_2O_2S$:$Eu_{0.082}$,$Nb_{0.037}$

Embodiment 14 . . . $Y_2O_2S$:$Eu_{0.082}$,$Nb_{0.073}$

Embodiment 15–18

The embodiments 15–18 were prepared in the same manner as the embodiment 1 except further adding $TiO_2$ and varying the amount of $TiO_2$ to obtain phosphors, the chemical formulas of which are as follows:

Embodiment 15 . . . $Y_2P_2S$:$Eu_{0.082}$,$Mg_{0.028}$,$Ti_{0.012}$

Embodiment 16 . . . $Y_2O_2S$:$Eu_{0.082}$,$Mg_{0.028}$,$Ti_{0.030}$

Embodiment 17 . . . $Y_2O_2S$:$Eu_{0.082}$,$Mg_{0.028}$,$Ti_{0.060}$

Embodiment 18 . . . $Y_2O_2S$:$Eu_{0.082}$,$Mg_{0.028}$,$Ti_{0.120}$

Embodiment 19–23

The embodiments 19–23 were prepared in the same manner as the embodiment 1 except further adding $TiO_2$ and varying the amount of $MgCO_3$ and $TiO_2$ to obtain phosphors, the chemical formulas of which are as follows:

Embodiment 19 . . . $Y_2O_2S$:$Eu_{0.082}$,$Mg_{0.011}$,$Ti_{0.108}$

Embodiment 20 . . . $Y_2O_2S$:$Eu_{0.082}$,$Mg_{0.028}$,$Ti_{0.009}$

Embodiment 21 . . . $Y_2O_2S$:$Eu_{0.082}$,$Mg_{0.057}$,$Ti_{0.060}$

Embodiment 22 . . . $Y_2O_2S$:$Eu_{0.082}$,$Mg_{0.086}$,$Ti_{0.030}$

Embodiment 23 . . . $Y_2O_2S$:$Eu_{0.082}$,$Mg_{0.103}$,$Ti_{0.012}$

Embodiment 24–27

The embodiments 24–27 were prepared in the same manner as the embodiment 1 except further adding $Nb_2O_5$ and varying the amount of $Nb_2O_5$ to obtain phosphors, the chemical formulas of which are as follows:

Embodiment 24 . . . $Y_2O_2S$:$Eu_{0.082}$,$Mg_{0.028}$,$Nb_{0.007}$

Embodiment 25 . . . $Y_2O_2S$:$Eu_{0.082}$,$Mg_{0.028}$,$Nb_{0.018}$

Embodiment 26 . . . $Y_2O_2S$:$Eu_{0.082}$,$Mg_{0.028}$,$Nb_{0.037}$

Embodiment 27 . . . $Y_2O_2S$:$Eu_{0.082}$,$Mg_{0.028}$,$Nb_{0.073}$

Embodiments 28–31

The embodiments 28–31 were prepared in the same manner as the embodiment 1 except further adding $Nb_2O_2$ and varying the amount of $MgCO_3$ and $Nb_2O_5$ to obtain phosphors, the chemical formulas of which are as follows:

Embodiment 28 . . . $Y_2O_2S$:$Eu_{0.082}$,$Mg_{0.011}$,$Nb_{0.065}$

Embodiment 29 . . . $Y_2O_2S$:$Eu_{0.082}$,$Mg_{0.028}$,$Nb_{0.055}$

Embodiment 30 . . . $Y_2O_2S$:$Eu_{0.082}$,$Mg_{0.057}$,$Nb_{0.037}$

Embodiment 31 . . . $Y_2O_2S$:$Eu_{0.082}$,$Mg_{0.086}$,$Nb_{0.018}$

Embodiments 32–38

The embodiments 32–38 were prepared in the same manner as embodiment 22 except varying the amount of $EU_2O_3$ to obtain phosphors, the chemical formulas of which are as follows:

Embodiment 32 ... $Y_2O_2S:Eu_{0.00003},Mg_{0.086},Ti_{0.030}$

Embodiment 33 ... $Y_2O_2S:Eu_{0.00028},Mg_{0.086},Ti_{0.003}$

Embodiment 34 ... $Y_2O_2S:Eu_{0.0028},Mg_{0.086},Ti_{0.030}$

Embodiment 35 ... $Y_2O_2S:Eu_{0.028},Mg_{0.086},Ti_{0.030}$

Embodiment 36 ... $Y_2O_2S:Eu_{0.055},Mg_{0.086},Ti_{0.030}$

Embodiment 37 ... $Y_2O_2S:Eu_{0.055},Mg_{0.086},Ti_{0.030}$

Embodiment 38 ... $Y_2O_2S:Eu_{0.110},Mg_{0.086},Ti_{0.030}$

Figure 5:
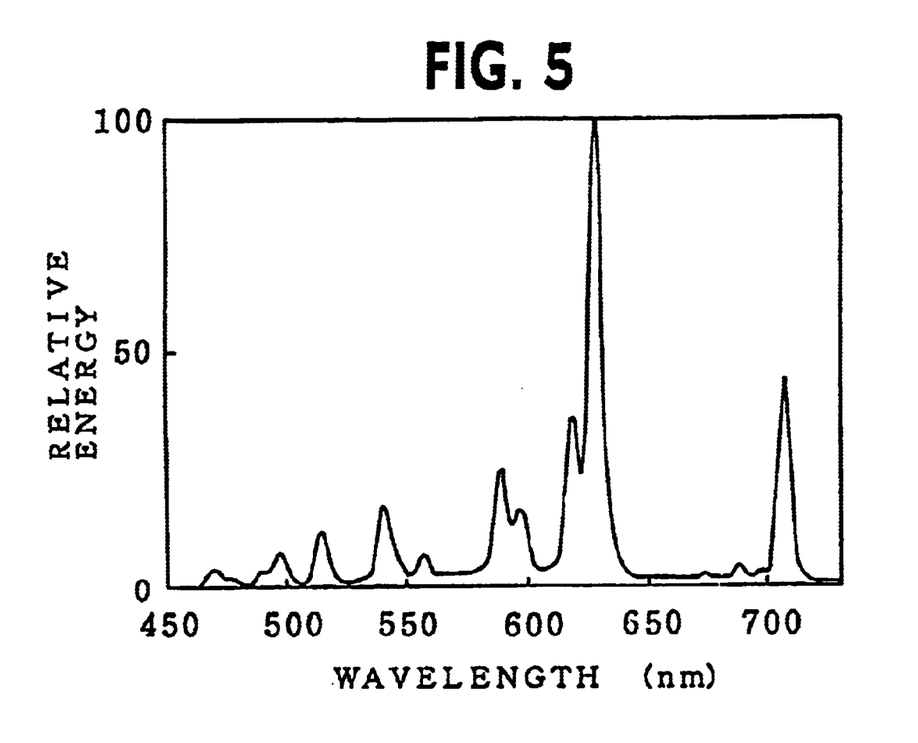
FIG. 5 is a graph showing the emission spectrum of the phosphor obtained by the embodiment 34 of the present invention excited by 365 nm wavelength.

FIG. 5 shows the emission spectrum of the phosphor obtained by this embodiment 34 excited by 365 nm wavelength.

Embodiments 39–42

The embodiments 39–42 were prepared in the same manner as embodiment 22 except further adding $Nb_2O_5$ and varying the amount of $Nb_2O_5$ to obtain phosphors, the chemical formulas are as follows:

Embodiment 39 ... $Y_2O_2S:Eu_{0.082},Mg_{0.086},Ti_{0.030},Nb_{0.0.007}$

Embodiment 40 ... $Y_2O_2S:Eu_{0.082},Mg_{0.086},Ti_{0.030},Nb_{0.0.018}$

Embodiment 41 ... $Y_2O_2S:Eu_{0.082},Mg_{0.086},Ti_{0.030},Nb_{0.0.037}$

Embodiment 42 ... $Y_2O_2S:Eu_{0.082},Mg_{0.086},Ti_{0.030},Nb_{0.0.073}$

Embodiments 43 and 44

The embodiments 43 and 44 were prepared in the same manner as embodiment 22 except placing $Y_2O_3$ with $Gd_2O_3$ partially or totally to obtain phosphors, the chemical formulas of which are as follows:

Embodiment 43 ... $(Y_{0.5}Gd_{0.5})_2O_2S:Eu_{0.082},Mg_{0.086},Ti_{0.030}$

Embodiment 44 ... $Gd_2O_2S:Eu_{0.082},Mg_{0.086},Ti_{0.030}$

Embodiments 45–48

The embodiments 45–48 were prepared in the same manner as embodiment 40 except replacing $Y_2O_3$ with $Gd_2O_3$ partially or totally and varying the amount of $Nb_2O_5$ to obtain phosphors, the chemical formulas of which are as follows:

Embodiment 45 ... $(Y_{0.5}Gd_{0.5})_2O_2S:Eu_{0.082}Mg_{0.086}, i_{0.030},Nb_{0.018}$ Embodiment 46 ... $Gd_2O_2S:Eu_{0.082},Mg_{0.086},Ti_{0.030},Nb_{0.018}$ Embodiment 47 ... $Gd_2O_2S:EU_{0.082},Mg_{0.086},Ti_{0.030},Nb_{0.037}$ Embodiment 48 ... $Gd_2O_2S:EU_{0.082},Mg_{0.086},Ti_{0.030},Nb_{0.073}$

Embodiments 49 and 50

The embodiments 49 and 50 were prepared in the same manner as embodiment 22 except replacing $Y_2O_3$ with $Lu_2O_3$ partially or totally to obtain phosphors, the chemical formulas of which are as follows:

Embodiment 49 ... $(Y_{0.5}Lu_{0.5})_2O_2S:Eu_{0.082},Mg_{0.086},Ti_{0.030}$

Embodiment 50 ... $Lu_2O_2S:Eu_{0.082},Mg_{0.086},Ti_{0.030}$

Embodiments 51 and 52

The embodiments 51 and 52 were prepared in the same manner as embodiment 40 except replacing $Y_2O_3$ with $Lu_2O_3$ partially or totally to obtain phosphors, the chemical formulas of which are as follows:

Embodiment 51 ... $(Y_{0.5}Lu_{0.5})_2O_2S:Eu_{0.082},Mg_{0.086},Ti_{0.030},Nb_{0.018}$ Embodiment 52 ... $Lu_2O_2S:Eu_{0.082},Mg_{0.086},Ti_{0.030}$

Embodiments 53 and 54

The embodiments 53 and 54 were prepared in the same manner as embodiment 22 except replacing $Y_2O_3$ with $Lu_2O_3$ partially or totally to obtain phosphors, the chemical formulas of which are as follows:

Embodiment 53 ... $(Y_{0.5}La_{0.5})_2O_2SEu_{0.082},Mg_{0.086}, Ti_{0.030}$

Embodiment 54 ... $La_2O_2S:Eu_{0.082},Mg_{0.086},Ti_{0.030}$

Embodiments 55 and 56

The embodiments 55 and 56 were prepared in the same manner as embodiment 40 except placing $Y_2O_3$ with $Lu_2O_3$ partially or totally to obtain phosphors, the chemical formulas of which are as follows:

Embodiment 55 ... $(Y_{0.5}La_{0.5})_2O_2SEu_{0.082},Mg_{0.086},Ti_{0.030},Nb_{0.018}$ Embodiment 56 ... $La_2O_2S:Eu_{0.082},Mg_{0.086},Ti_{0.030},Nb_{0.018}$

Embodiments 57 and 58

The embodiments 57 and 58 were prepared in the same manner as embodiment 22 and 40 except further adding $Ta2O_5$ to obtain phosphors, the chemical formulas of which are as follows:

Embodiment 57 ... $Y_2O_2S:Eu_{0.082},Mg_{0.086},Ti_{0.030},Ta_{0.023}$

Embodiment 58 ... $Y_2O_2S:Eu_{0.082},Mg_{0.086},Ti_{0.030},Nb_{0.018},Ta_{0.023}$

Embodiments 59–62

The embodiments 59–62 were prepared in the same manner as embodiment 1 except further adding $Ga2O_3$ and varying the amount of $Ga_2O_3$ to obtain phosphors, the chemical formulas of which are as follows:

Embodiment 59 ... $Y_2O_2s:Eu_{0.082},Mg_{0.028},Ga_{0.005}$

Embodiment 60 ... $Y_2O_2s:Eu_{0.082},Mg_{0.028},Ga_{0.010}$

Embodiment 61 ... $Y_2O_2s:Eu_{0.082},Mg_{0.028},Ga_{0.015}$

Embodiment 62 ... $Y_2O_2s:Eu_{0.082},Mg_{0.028},Ga_{0.020}$

Embodiments 63–66

The embodiments 63–66 were prepared in the same manner as embodiment 60 except further adding $TiO_2$ and varying the amount of $TiO_2$ to obtain phosphors, the chemical formulas of which are as follows:

Embodiment 63 ... $Y_2O_2S:Eu_{0.082},Mg_{0.028},Ga_{0.010},Ti_{0.012}$

Embodiment 64 ... $Y_2O_2S:Eu_{0.082},Mg_{0.028},Ga_{0.010},Ti_{0.030}$

Embodiment 65 ... $Y_2O_2S:Eu_{0.082},Mg_{0.028},Ga_{0.010},Ti_{0.060}$

Embodiment 66 ... $Y_2O_2S:Eu_{0.082},Mg_{0.028},Ga_{0.010},Ti_{0.120}$

Embodiments 67–68

The embodiments 67–68 were prepared in the same manner as embodiment 60 except further adding $Nb_2O5$ or $Ta_2O_5$ to obtain phosphors, the chemical formulas of which are as follows:

Embodiment 67 ... $Y_2O_2S:Eu_{0.082},Mg_{0.028},Ga_{0.010},Nb_{0.018}$

Embodiment 68 ... $Y_2O_2S:Eu_{0.082},Mg_{0.028},Ga_{0.010},Ta_{0.023}$

Embodiments 69 and 70

The embodiments 69 and 70 were prepared in the same manner as embodiment 65 except placing $Y_2O_3$ with $Lu_2O_3$ partially or totally to obtain phosphors, the chemical formulas of which are as follows:

Embodiment 69 ... $(Y_{0.5}La_{0.5})_2O_2S:Eu_{0.082},Mg_{0.082},Ga_{0.010},Ti_{0.060}$ Embodiment 70 ... $La_2O_2S:Eu_{0.082},Mg_{0.028},Ga_{0.010},Ti_{0.060}$ Embodiments 71 and 72

The embodiments 71 and 72 were prepared in the same manner as embodiment 65 except replacing $Y_2O_3$ with $Gd_2O_3$ partially or totally to obtain phosphors, the chemical formulas of which are as follows:

Embodiment 71 ... $(Y_{0.5}Gd_{0.5})_2O_2S:Eu_{0.082},Mg_{0.028},Ga_{0.010},Ti_{0.060}$ Embodiment 72 ... $Gd_2O_2S:Eu_{0.082},Mg_{0.028},Ga_{0.010},Ti_{0.060}$ Embodiments 73 and 74

The embodiments 73 and 74 were prepared in the same manner as embodiment 65 except replacing $Y_2O_3$ with $Lu_2O_3$ partially or totally to obtain phosphors, the chemical formulas of which are as follows:

Embodiment 73 ... $(Y_{0.5}Lu_{0.5})_2O_2S:Eu_{0.082},Mg_{0.028},Ga_{0.010},Ti_{0.006}$ Embodiment 74 ... $Lu_2O_2S:Eu_{0.082},Mg_{0.028},Ga_{0.010},Ti_{0.060}$ In measuring the phosphorescent luminance of the phosphor of the present invention, at first a definite sample should be prepared by following steps: adding 0.5 g of acrylic resin varnish to 1 g of phosphor sample, mixing them sufficiently and carefully, to prevent grinding, then applying them to an aluminum sheet to have a thickness of more than 100 mg/cm$^2$, and drying them to obtain a test sample piece. This sample piece was used for the measurement of the phosphorescent luminance.

The measurement of the phosphorescent luminance was performed referring to JIS Z 9100 (method of measuring phosphorescent luminance of light storing safety sign panels). After the test piece was maintained in a dark place more than 3 hours shielding from light, the test piece was exposed with the light emitted from a common light source D65 with luminous flux density 200 lux for 4 minutes, then the phosphorescent luminance was measured after light emission terminated In addition, the phosphorescent luminance was also measured in the same manner employing a black light lamp (with the intensity of 0.5 mW/cm$^2$) emitting ultraviolet rays 365 nm in wavelength as a exciting light source, having exposing for 15 minutes.

Tables 1, 2 and 3 show the phosphorescent luminance 1 minute and 10 minutes later, after terminating excitation of the phosphors obtained in the embodiments 11–74 of the present invention, and CaS;Eu,Tm phosphor, which is a conventional light storing phosphor of red light emission as comparative example. As shown in these tables, it is found that the phosphor of the present invention has long afterglow characteristics and also high phosphorescent luminance.

Phosphorescent Luminance (mcd/cm$^2$)

D65 light source 365 nm light source 1 minute after 10 minutes after 1 minute after 10 minutes after Embodiment 1 Embodiment 2 ...

TABLE 1

| | Phosphorescent Luminance [mcd/m$^2$] | | | |
|---|---|---|---|---|
| | D65 light source | | 365 nm light source | |
| | 1 minute later | 10 minutes later | 1 minute later | 10 minutes later |
| CaS:Eu, Tm | 62 | 3 | 52 | 2 |
| embodiment 11 | 8 | 1 | 30 | 2 |
| embodiment 12 | 7 | 1 | 28 | 2 |
| embodiment 13 | 6 | 1 | 25 | 2 |
| embodiment 14 | 7 | 0 | 26 | 1 |
| embodiment 15 | 92 | 16 | 365 | 29 |
| embodiment 16 | 102 | 18 | 392 | 35 |
| embodiment 17 | 115 | 19 | 401 | 37 |
| embodiment 18 | 94 | 17 | 362 | 33 |
| embodiment 19 | 110 | 16 | 372 | 31 |
| embodiment 20 | 127 | 19 | 407 | 35 |
| embodiment 21 | 131 | 19 | 421 | 37 |
| embodiment 22 | 117 | 21 | 431 | 39 |
| embodiment 23 | 120 | 18 | 412 | 36 |
| embodiment 24 | 47 | 5 | 185 | 8 |
| embodiment 25 | 55 | 8 | 215 | 15 |

TABLE 2

| | Phosphorescent Luminance (mcd/m$^2$) | | | |
|---|---|---|---|---|
| | D65 light source | | 365 nm light source | |
| | 1 minute later | 10 minutes later | 1 minute later | 10 minutes later |
| embodiment 26 | 48 | 8 | 188 | 16 |
| embodiment 27 | 42 | 7 | 165 | 13 |
| embodiment 28 | 40 | 6 | 157 | 12 |
| embodiment 29 | 44 | 7 | 173 | 14 |
| embodiment 30 | 59 | 8 | 232 | 17 |
| embodiment 31 | 36 | 5 | 137 | 9 |
| embodiment 32 | 152 | 32 | 720 | 68 |
| embodiment 33 | 217 | 39 | 872 | 81 |
| embodiment 34 | 184 | 34 | 734 | 71 |
| embodiment 35 | 138 | 28 | 490 | 49 |
| embodiment 36 | 98 | 21 | 392 | 38 |
| embodiment 37 | 83 | 17 | 325 | 31 |
| embodiment 38 | 80 | 12 | 301 | 23 |
| embodiment 39 | 101 | 21 | 395 | 40 |
| embodiment 40 | 97 | 22 | 375 | 44 |
| embodiment 41 | 86 | 22 | 344 | 46 |
| embodiment 42 | 75 | 23 | 295 | 47 |
| embodiment 43 | 86 | 16 | 385 | 34 |
| embodiment 44 | 57 | 15 | 365 | 29 |
| embodiment 45 | 82 | 17 | 346 | 35 |
| embodiment 46 | 55 | 19 | 336 | 40 |
| embodiment 47 | 51 | 21 | 312 | 45 |
| embodiment 48 | 45 | 24 | 275 | 48 |
| embodiment 49 | 68 | 19 | 265 | 21 |
| embodiment 50 | 17 | 4 | 65 | 7 |

TABLE 3

| | Phosphorescent Luminance (mcd/m$^2$) | | | |
|---|---|---|---|---|
| | D65 light source | | 365 nm light source | |
| | 1 minute later | 10 minutes later | 1 minute later | 10 minutes later |
| CaS:Eu, Tm | 62 | 3 | 52 | 2 |
| embodiment 51 | 42 | 14 | 170 | 27 |
| embodiment 52 | 12 | 6 | 50 | 10 |
| embodiment 53 | 39 | 5 | 138 | 9 |
| embodiment 54 | 6 | 0 | 27 | 1 |
| embodiment 55 | 28 | 6 | 107 | 12 |
| embodiment 56 | 5 | 0 | 20 | 1 |
| embodiment 57 | 92 | 19 | 379 | 40 |
| embodiment 58 | 89 | 24 | –347 | 49 |
| embodiment 59 | 25 | 3 | 70 | 2 |
| embodiment 60 | 27 | 2 | 68 | 2 |
| embodiment 61 | 28 | 3 | 69 | 2 |
| embodiment 62 | 27 | 3 | 66 | 2 |
| embodiment 63 | 109 | 18 | 379 | 31 |
| embodiment 64 | 124 | 21 | 402 | 37 |
| embodiment 65 | 137 | 22 | 412 | 38 |
| embodiment 66 | 115 | 20 | 381 | 35 |
| embodiment 67 | 70 | 10 | 220 | 16 |
| embodiment 68 | 55 | 9 | 170 | 10 |
| embodiment 69 | 46 | 6 | 152 | 10 |
| embodiment 70 | 6 | 0 | 26 | 1 |
| embodiment 71 | 101 | 18 | 390 | 37 |
| embodiment 72 | 82 | 20 | 395 | 32 |
| embodiment 73 | 82 | 22 | 302 | 23 |
| embodiment 74 | 25 | 6 | 70 | 8 |

Figure 6:
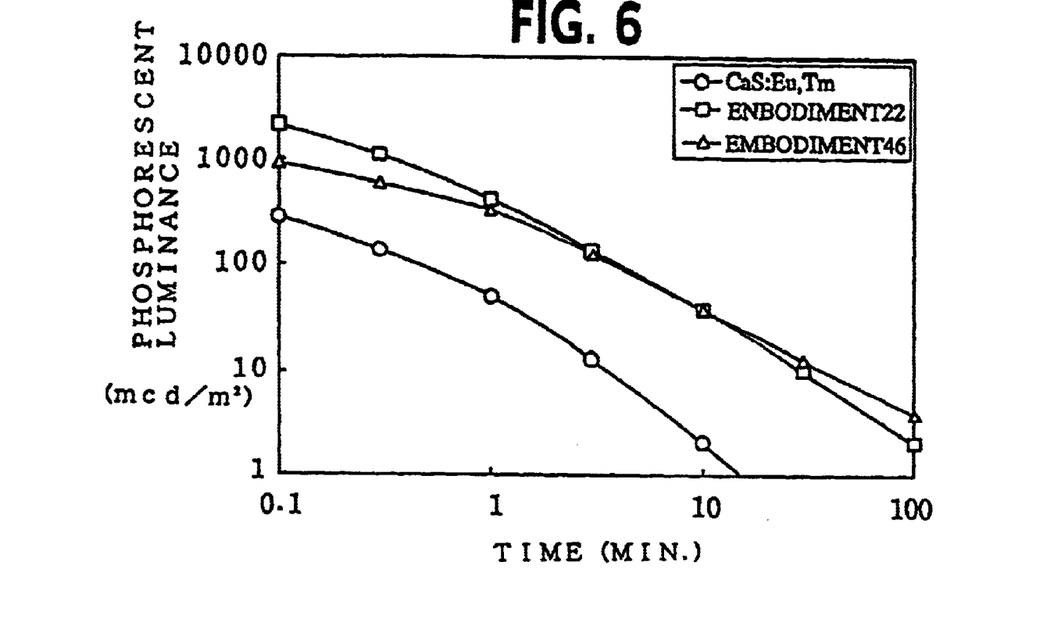
FIG. 6 is a graph comparing the afterglow characteristics of the phosphor obtained by the embodiments 22 and 46 of the present invention, with the afterglow characteristics of the conventional CaS:Eu,Tm phosphor.

FIG. 6 shows an afterglow characteristics of the phosphor obtained in the embodiments 22 and 46 of the present invention, and as a comparison, phosphor CaS:Eu,Tm which is a conventional light storing phosphor of red light emitting using the above mentioned black light lamp. As seen in this Figure, the phosphorescent luminance of the phosphor $Y_2O_2S:Eu_{0.082},Mg_{0.086},Ti_{0.030}$ of the embodiment 22, and the phosphor $Gd_2O_2S:Eu_{0.082},Mg_{0.006},Ti_{0.030},Nb_{0.018}$ of the embodiment 46 were extremely high compared with the conventional CaS:Eu,Tm phosphor, and the afterglow lasted quite long after termination of light excitation.

Figure 7:
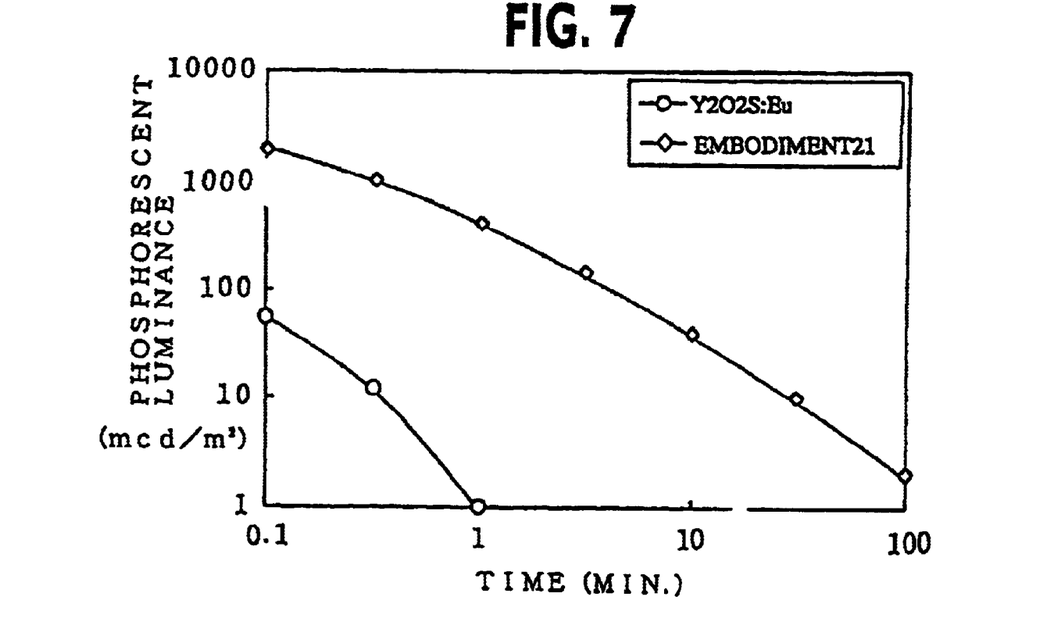
FIG. 7 is a graph comparing the afterglow characteristics of the phosphor obtained by the embodiment 21 of the present invention, with the afterglow characteristics of the conventional $Y_2O_2S$:Eu phosphor.

FIG. 7 shows an afterglow characteristics of the phosphor obtained in the embodiment 21 of the present invention, and as a comparison, phosphor $Y_2O_2S:Eu$ which is a conventional red light emitting phosphor, using the above mentioned black light lamp. As seen in this Figure, in the case of the phosphor $Y_2O_2S:Eu_{0.082},Mg_{0.057},Ti_{0.060}$ of the embodiment 21, the phosphorescent luminance was much higher by activating with Mg as the first coactivator and with Ti as the second coactivator in virtue of synergism.

Figure 8:
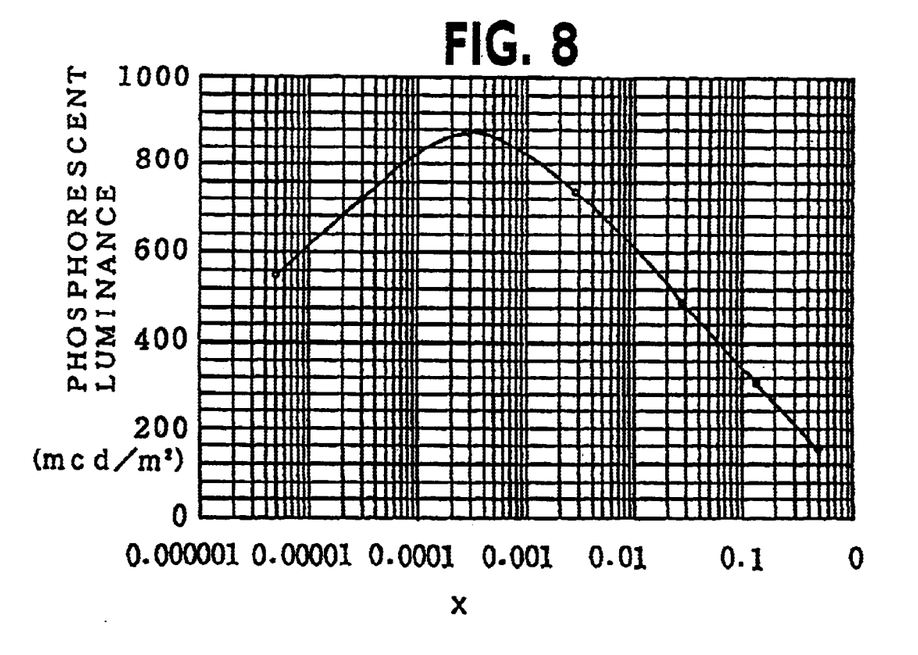
FIG. 8 is a characteristics graph showing the relation between the content x of the Eu of the $Y_2O_2S$:$Eu_x$,$Mg_{0.086}$, $Ti_{0.030}$ phosphor and the phosphorescent luminance measured one minute after the termination of excitation of a black light lamp.

FIG. 8 shows the relations the content x of Eu in phosphor $Y_2O_2S:Eu_x, Mg_{0.086},Ti_{0.030}$ and the phosphorescent luminance of which one minute after the termination of excitation, using the above mentioned black light lamp. As shown in this Figure, it appears that the phosphorescent luminance is considerably improved within the optimum concentration range, $0.00001 \leq x \leq 0.1$.

Figure 9:
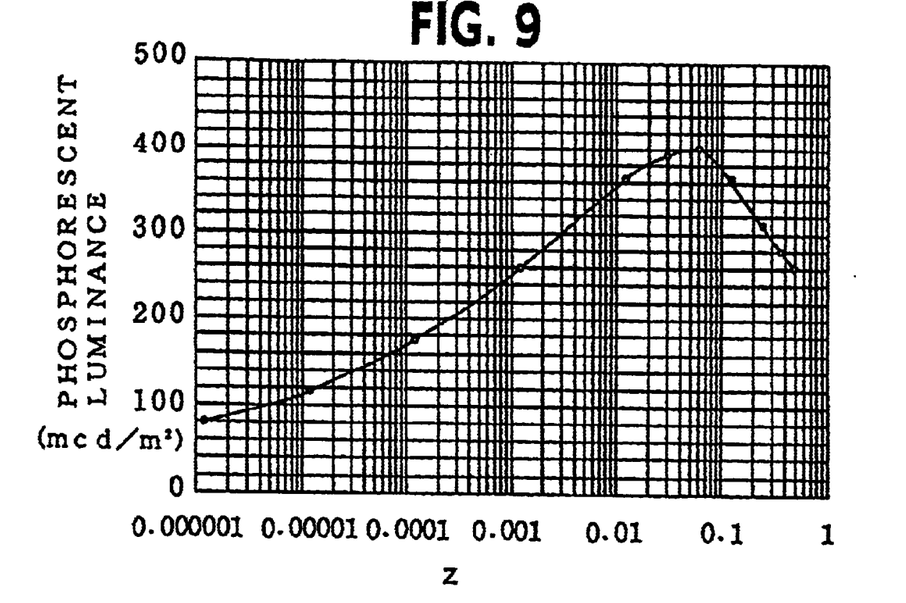
FIG. 9 is a characteristics graph showing the relation between the content z of the Ti of $Y_2O_2S$ :$EU_{0.082}$,$Mg_{0.028}$, $Ti_z$ phosphor and the phosphorescent luminance measured one minute after the termination of excitation of a black light lamp.

FIG. 9 shows the relations between the content z of phosphor Ti in $Y_2O_2S:Eu_{0.082}, M\&_{0.028},Ti_z$ and the phosphorescent luminance of which one minute after the termination of excitation, using the above mentioned black light lamp. As shown in this Figure, it appears that the phosphorescent luminance is considerably improved within the optimum concentration range, $0.0001 \leq z \leq 0.3$.

Embodiment 75

Followings are explanation of which the red light emitting afterglow phosphor $Y_2O_2S:Eu_{0.085},Mg_{0.089},Ti_{0.016}$ was excited by light emission of the three component type phosphor, especially these phosphors are completely mixed in the fluorescent layer of a fluorescent lamp.

As the raw material of an afterglow phosphor, 90.5 g (0.40 mol) of $Y_2O_3$, 6.0 g (0.017 mol) of $Eu_2O_3$, 3.0 g (0.036 mol) of $MgCO_3$ and 0.5 g (0.0063 mol) of $TiO_2$ were measured and prepared. Next putting them into a ceramic pot, and sufficiently blended by a ball mill, then a mixed raw material (hereinafter referred as a raw material powder) was obtained. After that, 45.4 g (1.42 mol) of sulfur (S) and 44.0 g (0.415 mol) of $Na_2CO_3$, as a flux, were added and mixed to the raw material powder, this mixture was filled into an alumina crucible and heated for 6 hours at the temperature of 1100° C. After heating, the flux was washed off by water several times, and dried for 10 hours at the temperature of 120° C. Finally, by filtering through a 200 mesh screen, an afterglow phosphor with its chemical formula $Y_2O_2S:Eu_{0.085},Mg_{0.0089},Ti_{0.016}$ was prepared. This phosphor has a red light emission with 625 nm wavelength light emission peak.

The obtained afterglow phosphor was well mixed with the three component type phosphor, which was obtained by 36% of blue light emitting phosphor $(SrCaBaMg)_5(PO_4)_3Cl:Eu$ having a light emission peak 453 nm wavelength, 32% of green light emitting phosphor $LaPO_4:Ce,Tb$ having a light emission peak 544 nm wavelength and 32% of red light emitting phosphor $Y_2O_3:Eu$ having a light emission peak 611 nm wavelength, at 1:4 ratio.

Then 20 g of the mixed phosphor and 20 g of nitrocellulose/butyl acetate binder were fully mixed in a ceramic pot to prepare a phosphor coating slurry. This slurry was flowed into a glass tube FL40SS to coat on the inner surface of the tube, and it was dried by blowing heated air. Then the coated bulb was baked at 580° C. for 15 minutes whereby a fluorescent layer was formed. The amount of phosphor coated on which was 4.0 g per fluorescent lamp. Thereafter, according to common manufacturing steps including exhaustion, filament fitting, base attachment or the like, fluorescent lamp was completed. Table 4 shows its measurement of the obtained afterglow florescent lamps. In this table, afterglow luminous flux shows a value measured after one minute from extinction.

Embodiment 76

Following is an explanation of so-called bilayer coating, which comprises the steps of applying afterglow phosphor as the first layer, and coating the three component type phosphor as the second layer thereon. 20 g of nitrocellulose/butyl acetate binder were added to 15 g of phosphor $Y_2O_2S:Eu_{0.085},Mg_{0.089},Ti_{0.016}$ obtained in the embodiment 75, and sufficiently mixed in a ceramic pot to prepare a phosphor coating slurry. This slurry was flowed into a glass tube FL40SS, coated on the inner surface of the tube, and dried by blowing heated air. The measured amount of afterglow phosphor in the first layer was 3 g. Then the three component type phosphor was prepared by mixing 33% of blue light emitting phosphor $(SrCaBaMg)_5(PO_4)_3Cl:Eu$, 31% of green light emitting phosphor $LaPO_4:Ce,Tb$ and 36% of red light emitting phosphor $Y_2O_2S:Eu$, and 30 g of which was added to 50 g of polyethylene oxide aqueous solution. The mixture was well mixed in a ceramic pot to prepare a phosphor coating slurry. This slurry was flowed into the glass tube, coated on its inner surface, and dried blowing heated air, so as to form the second layer. The measured amount of the coated three wavelength mixed phosphor of the second layer was 3 g. Thereafter, according to common steps of evacuation, filament fitting and base attachment, a fluorescent lamp was manufactured. The measured data of this obtained fluorescent lamp was shown in Table 4.

Embodiment 77

At this embodiment, it will be illustrated that red light emitting afterglow phosphor $Gd_2O_2S:Eu_{0.082},Mg_{0.086},Ti_{0.030}$ was excited to emit light by the three component type phosphor, especially in which these phosphors were fully mixed in a fluorescent layer of a fluorescent lamp.

Afterglow phosphor was prepared in the same manner as the embodiment 75 except using 90.5 g (0.250 mol) of $Gd_2O_3$ instead of $Y_2O_3$ as a raw material. This phosphor has a red light emission with light emission peak 625 nm of wavelength.

The obtained afterglow phosphor, and the three component type phosphor obtained in the same manner as the embodiment 75, were fully mixed in the ratio of 1:4, then a fluorescent lamp was manufactured in the same manner as the embodiment 75. The measured data of the obtained fluorescent lamps are shown in Table 4.

Embodiment 78

A bilayer fluorescent lamp was manufactured in the same manner as the embodiment 76, except using phosphor $Gd_2O_2S:Eu_{0.082},Mg_{0.086},Ti_{0.030}$ obtained in the embodiment 77, instead of phosphor $Y_2O_2S:Eu_{0.085},Mg_{0.089},Ti_{0.016}$ obtained in the embodiment 75. The measured data of the obtained fluorescent lamp is shown in Table 4.

TABLE 4

| | x | y | Im | Afterglow luminous flux* [lm] |
|---|---|---|---|---|
| Embodiment 75 | 0.3320 | 0.3407 | 3537 | 15 |
| Embodiment 76 | 0.3327 | 0.3398 | 3625 | 21 |
| Embodiment 77 | 0.3331 | 0.3410 | 3552 | 11 |
| Embodiment 78 | 0.3328 | 0.3401 | 3607 | 14 |

*Afterglow luminous flux was measured one minute later the extinction.

Comparative Example 1

As a comparative example 1, a fluorescent lamp was manufactured in the same manner as the embodiment 75, in which phosphor ZnS:Cu was selected as afterglow phosphor, and the three component type phosphor was prepared by mixing 34.1% of blue light emitting phosphor $(SrCaBaMg)_5(PO_4)_3Cl:Eu$, 16.8% of green light emitting phosphor $LaPO_4:Ce,Tb$ and 49.1% of red light emitting phosphor $Y_2O_3:Eu$, then they were well mixed in the ratio of 1:3. The obtained fluorescent lamp was wholly blackish and had poor lamp luminous flux, thus this fluorescent lamp was unmarketable.

Comparative Example 2

As another comparative example, so-called bilayer coating which comprises the steps of coating afterglow phosphor ZnS:Cu, same as the comparative example 1, as the first layer, and coating the three component type phosphor as the second layer thereon is illustrated as follows: adding 30 g of phosphor ZnS:Cu to 15 g of nitrocellulose/butyl acetate binder, mixing them completely in a ceramic pot to prepare a phosphor coating slurry. This slurry was flowed into a glass tube FL40SS to coat on the inner surface of the glass tube, and dried by blowing heated air. The measured amount of coated afterglow phosphor in the first layer was 3 g. Then the three component type phosphor was prepared by mixing 30.2% of blue light emitting phosphor $(SrCaBaMg)_5(PO_4)_3Cl:Eu$, 29.4% of green light emitting phosphor $LaPO_4:Ce,Tb$ and 40.4% of red light emitting phosphor $Y_2O_2:Eu$, 12 g of three wavelength mixed phosphor was added to 50 g of polyethylene oxide aqueous solution and they were fully mixed in a ceramic pot to prepare a phosphor coating slurry. This slurry was flowed into a glass cube to coat on the inner surface of the tube, and dried blowing heated air. The measured amount of the coated three component type phosphor as second layer was 3.0 g. Thereafter, according to the common steps of exhaustion, filament fitting and base attachment, a fluorescent lamp was manufactured. The obtained fluorescent lamp was wholly blackish and had poor lamp luminous flux so that this fluorescent lamp was unmarketable.

Next, the following embodiments were tested to show that the phosphorescent luminance of the red light emitting afterglow photoluminescence phosphor depends on the particle diameter.

Example 2 Showing a Manufacturing Method

This example does not show an embodiment of the present invention. As a raw material of an afterglow phosphor, a mixed raw material (hereinafter referred as raw material powder) was prepared by which 46.5 g (its average particle diameter was 1.0 $\mu$m) of $Y_2O_3$, 3.0 g of $Eu_2O_3$, and 0.5 g of $MgCO_3$ were measured and put into a ceramic pot, then well blended by a ball mill. Next, 22.7 g of sulfur (S), 22.0 g of $Na_2CO_3$ as flux were added to and mixed with the raw material powder, its mixture was filled into an alumina crucible and heated for 6 hours at the temperature of 1150° C.

After heating, it was washed off the flux by water several times, and dried for 10 hours at the temperature of 120° C. Finally a phosphor with the chemical formula of $Y_2O_2O:Eu_{0.082},Mg_{0.028}$ and the average particle diameter 7.2 $\mu$m was prepared.

Embodiments 83–86

The embodiments 83–86 were prepared respectively in the same manner as the example 2, except further adding $TiO_2$ and changing heating temperatures to 1150° C., 1200° C., 1250° C. and 1300° C., respectively. Each of the obtained phosphors had the chemical formula of $Y_2O_2S:Eu_{0.082},Mg_{0.026},TiO_{0.030}$, and their average particle diameter was 7.4 $\mu$m, 11.5 $\mu$m, 17.3 $\mu$m and 23.1 $\mu$m, respectively.

Embodiments 91–94

The embodiments 91–94 were prepared in the same manner as the example 2, except using $Y_2O_3$ (1.5 $\mu$m of average particle diameter), instead of $Y_2O_3$ (1.0 $\mu$m of average particle diameter), further adding $TiO_2$ and changing heating temperatures to 1150° C., 1200° C., 1250° C. and 1300° C., respectively. Each of the obtained phosphors had the chemical formula $Y_2O_2S:Eu_{0.082},Mg_{0.086},TiO_{0.030}$, and their average particle diameter was 8.8 $\mu$m, 14.8 $\mu$m 20.4 $\mu$m and 26.3 $\mu$m, respectively.

In the embodiments 79–94, each average particle diameter was calculated as its average of the particle diameter of the primary particle, and measured by using Fischer sub-sieve sizer (F.S.S.S.).

Table 5 shows the phosphorescent luminance measured one minute and 10 minutes after the excitation was terminated, and the average particle diameter of the phosphors obtained in the embodiments 83–86 and 91–94, comparing with the conventional red light emitting and storing phosphor CaS:Eu,Tm. As shown in this Figure, the phosphor of the present invention has long afterglow characteristics as well as high phosphorescent luminance.

TABLE 5

| | Average particle diameter [μm] | Phosphorescent Luminance [mcd/m²] | | | |
|---|---|---|---|---|---|
| | | D65 light source | | 365 nm light source | |
| | | 1 minute later | 10 minutes later | 1 minute later | 10 minutes later |
| CaS:Eu, Tm | — | 62 | 3 | 52 | 2 |
| Embodiment 83 | 7.4 | 137 | 24 | 462 | 48 |
| Embodiment 84 | 11.5 | 163 | 29 | 505 | 58 |
| Embodiment 85 | 17.3 | 186 | 34 | 534 | 68 |
| Embodiment 86 | 23.1 | 192 | 36 | 540 | 70 |
| Embodiment 91 | 8.8 | 148 | 26 | 481 | 52 |
| Embodiment 92 | 14.8 | 177 | 32 | 523 | 64 |
| Embodiment 93 | 20.4 | 191 | 36 | 539 | 70 |
| Embodiment 94 | 26.3 | 188 | 35 | 534 | 69 |

Figure 10:
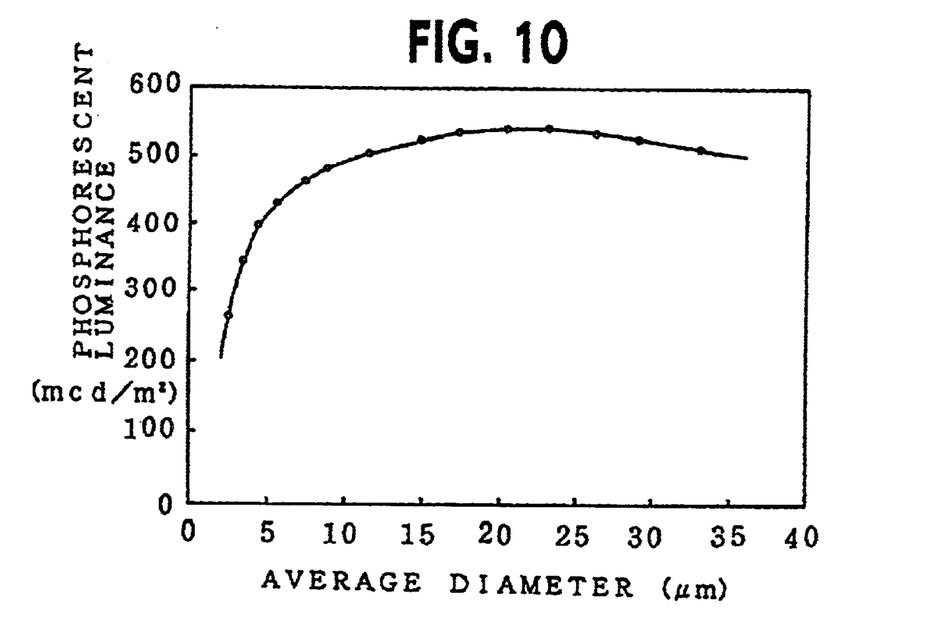
FIG. 10 is a characteristics graph showing the relation between the average particle diameter of $Y_2O_2S$:$Eu_{0.082}$, $Mg_{0.086}$,$Ti_{0.030}$ phosphor and the phosphorescent luminance measured one minute after the termination of excitation of a black light lamp.

FIG. 10 shows the relation between the average particle diameter of phosphors $Y_2O_2S:Eu_{0.082},Mg_{0.086},Ti_{0.030}$ and the phosphorescent luminance measured after 1 minute from the termination of excitation by the above mentioned black light lamp. As seen in this Table, it appears that if the average particle diameter was smaller than 5 μm, then the phosphorescent luminance decreases rapidly, if the average particle diameter was larger than around 23 μm, in which phosphorescent luminance reached maximum, then the phosphorescent luminance degrades gently depending on the substance color of the phosphor (it turned from white to tinged yellow). Thus, it was found that the phosphorescent luminance was high stability within 5–30 μm of the average particle diameter. Further, the phosphorescent luminance was particularly higher with more stable within the range of 10–30 μm of average particle diameter. These tendencies were true for other phosphors of the present invention than these chemical formula. The optimum average particle diameter was within 5–30 μm and more preferably, in the range of 10–30 μm.

As explained above, for the rare earth oxysulfide phosphor activated by Europium, it can achieve chemical stability and long lasting red light emitting afterglow photoluminescence phosphor by introducing at least one element as coactivator selected from the group consisting of Mg, Ti, Nb, Ta and Ga, and by setting the average particle diameter within 5–30 μm, which could not be achieved using the conventional phosphor CaS:Eu,Tm.

INDUSTRIAL APPLICABILITY

Red light emitting long afterglow photoluminescence phosphor and its afterglow lamp of the present invention are usable in the field for countering disaster based on its advantage that it has long afterglow for several tens of minutes after the excitation has stopped. Also, it is usable for the various areas such as illuminators bearing afterglow after extinction of lights, or clock face as visible in a dark place or the like.

What is claimed is:

1. An Eu activated red light emitting afterglow photoluminescence phosphor having the formula:

$$Ln_2O_2S:Eu_x,M_y$$

$$0.00001 \leq x \leq 0.5$$

$$0.00001 \leq y \leq 0.3$$

wherein Ln is at least one member selected from the group consisting of Y, La, Gd and Lu; M is a coactivator which is at least one member selected from the group consisting of Nb, Ta and Ga in the chemical formula.

2. The red light emitting afterglow photoluminescence phosphor as claimed in claim 1 in which the range of x is $0.00001 \leq x \leq 0.1$.

3. The red light emitting afterglow photoluminescence phosphor as claimed in claims 1 in which Ln is Y.

4. The red light emitting afterglow photoluminescence phosphor as claimed in claim 1 having an average particle diameter within the range of 5–30 μm.

5. An Eu activated red light emitting afterglow photoluminescence phosphor having the formula:

$$Ln_2O_2S:Eu_x,Mg_y,M'_z$$

$$0.00001 \leq x \leq 0.5$$

$$0.00001 \leq y \leq 0.3$$

$$0.00001 \leq z \leq 0.3$$

wherein Ln is at least one member selected from the group consisting of Y, La, Gd and Lu; Mg is a first coactivator; and M' is a second coactivator which is at least one member selected from the group consisting of Ti, Nb, Ta and Ga.

6. The red light emitting afterglow photoluminescence phosphor as claimed in claim 5 in which M' is Ti, and z is in the range of $0.0001 \leq z \leq 0.3$.

7. The red light emitting afterglow photoluminescence phosphor as claimed in claim 5 in which M' is Nb, and z is in the range of $0.005 z \leq 0.1$.

8. The red light emitting afterglow photoluminescence phosphor as claimed in claim 5 in which M' is Ta, and z is in the range of $0.001 z \leq 0.2$.

9. The red light emitting afterglow photoluminescence phosphor as claimed in claim 5 in which M' is Ga, and z is in the range of $0.001 \leq z \leq 0.2$.

10. The red light emitting afterglow photoluminescence phosphor as claimed in claim 5 in which the average particle diameter is in the range of 5–30 μm.

11. In an afterglow lamp comprising a light emitting section which converts electric energy to optical energy, including a transparent glass covering therefor, the improvement comprising a fluorescent layer provided at least either on the inner surface or on the outer surface of said transparent glass, and said fluorescent layer comprising an Eu activated red light emitting afterglow photoluminescence phosphor having the following formula:

$Ln_2O_2S:Eu_x,M_y$ $0.00001 \leq x \leq 0.5$ $0.00001 \leq y \leq 0.3$ wherein Ln is at least one member selected from the group consisting of Y, La, Gd and Lu; M is a coactivator which is at least one member selected from the group consisting of Nb, Ta and Ga in the formula.

12. The afterglow lamp as claimed in claim 11, in which x is within the range of $0.00001 \leq x \leq 0.1$ in the formula of the red light emitting afterglow photoluminescence phosphor.

13. The afterglow lamp as claimed in claim 11, in which Ln is Y.

14. The afterglow lamp as claimed in claim 11, in which the average particle diameter of the red light emitting afterglow photoluminescence phosphor is within the range of 5–30 μm.

15. The afterglow lamp as claimed in claim 11, which is a fluorescent lamp.

16. The afterglow lamp as claimed in claim 15 in which the fluorescent layer of the afterglow lamp comprises said red light emitting afterglow photoluminescence phosphor, and a phosphor which excites the afterglow phosphor and the light emitting color is in a white color range.

17. The afterglow lamp as claimed in claim 16 in which said fluorescent layer comprises said red light emitting afterglow photoluminescence phosphor and at least one of three component type phosphors composed of a blue light emitting phosphor having a light emission peak around 450 nm wavelength, a green light emitting phosphor having a light emission peak around 545 nm wavelength and a red light emitting phosphor having a light emission peak around 610 nm wavelength.

18. The afterglow lamp as claimed in claim 16 having two or more of said fluorescent layers and said afterglow phosphor is coated as a layer closest to the glass covering.

19. In a lamp comprising a light emitting section which converts electric energy to optical energy, and a transparent glass covering thereon, the improvement comprising a Eu activated fluorescent layer provided on at least one side either the inner surface or the outer surface of said transparent glass, and said fluorescent layer having a red light emitting afterglow photoluminescence phosphor which is represented by the following formula:

$Ln_2O_2S:Eu_x,Mg_y,M'_z$ $0.00001 \leq x \leq 0.5$ $0.00001 \leq y \leq 0.3$ $0.00001 \leq z \leq 0.3$ wherein Ln in the formula is at least one member selected from the group consisting of Y, La, Gd and Lu; Mg is a first coactivator and M' is a second coactivator, which second coactivator is at least one member selected from the group consisting of Ti, Nb, Ta and Ga.

20. The afterglow lamp as claimed in claim 19, in which M' is Ti and z is within the range of $0.0001 \leq z \leq 0.3$ in the formula of said red light emitting afterglow photoluminescence phosphor.

21. The afterglow lamp as claimed in claim 19 in which M' is Nb, and z is within the range of $0.005 \leq z \leq 0.1$.

22. The afterglow lamp as claimed in claim 19 in which M' is Ta, and z is within the range of $0.001 \leq z \leq 0.2$.

23. The afterglow lamp as claimed in claim 19 in which M' is Ga, and z is within the range of $0.001 \leq z \leq 0.2$.

24. An afterglow lamp as claimed in claim 19, in which the average particle diameter of said red light emitting afterglow photoluminescence phosphor is within the range of 5–30 μm.

25. The afterglow lamp as claimed in claim 18, in which the afterglow lamp is a fluorescent lamp.

26. The afterglow lamp as claimed in claim 25 in which said fluorescent layer of the afterglow lamp comprises said red light emitting afterglow photoluminescence phosphor and a phosphor which excites the afterglow phosphor, and the light emitting color is in a white color range.

27. The afterglow lamp as claimed in claim 26 in which said fluorescent layer comprises said red light emitting afterglow photoluminescence phosphor and at least one of three component type phosphors composed of a blue light emitting phosphor having a light emission peak around 450 nm wavelength, a green light emitting phosphor having a light emission peak around 545 nm wavelength and a red light emitting phosphor having a light emission peak around 610 nm wavelength.

28. The afterglow lamp as claimed in claim 26 in which said fluorescent layer is formed by two or more fluorescent layers and said afterglow phosphor is coated as a layer closest to the glass covering.

* * * * *